Patented July 21, 1942

2,290,763

UNITED STATES PATENT OFFICE 2,290,763

METHOD OF TEMPERING GLASS ARTICLES

Donald W. Mueller, West Hartford, Conn., assignor to Hartford-Empire Company, Hartford, Conn., a corporation of Delaware No Drawing. Application February 1, 1940, Serial No. 316,805

8 Claims. (Cl. 49—89)

This invention relates to the tempering of glass articles and more particularly to the tempering of hollow glass articles, such as bottles and jars.

A glass article is tempered by cooling it abruptly through a suitable temperature range to cause therein permanent stresses in the form of compression of its surface layers and tension of its inner layers. The lower limit of this tempering temperature range is that temperature below which further abrupt cooling of the article will not create any permanent stresses therein but only transient stresses which will disappear on or before completion of cooling of the article to room temperature. This lower tempering limit is somewhat below the strain point (log. viscosity=13.4), the latter being that point below which moderate cooling, as in annealing operations, will not create any permanent stresses in the glass. The upper limit of this tempering range is practically that temperature at or very near the softening point of the glass article at which the necessary handling or manipulation of the glass article to permit the required tempering operation can be effected without objectionable deformation of the article.

The tempering range and the upper and lower limits thereof vary with the composition and nature of different glass articles. Of course, part or all of the glass of an article may be heated to a temperature higher than its softening point before abrupt cooling thereof is commenced.

The degree of temper per unit of thickness of a piece of a tempered glass article may be termed its temperity. The product of temperity times thickness is a measure of the increase in strength imparted to the piece of the glass article by the tempering operation.

The teaching of the prior art is that the higher in its tempering range at which abrupt cooling of an article is commenced and the greater the cooling rate at which the temperature of the article being tempered is lowered through that range, the greater will be the temperity of the tempered article. Proposals for tempering articles of glassware, such as bottles and jars, therefore have contemplated bringing each such article to a temperature at or very near its softening point and thereafter rapidly cooling such article down to and through the lower limit of its tempering range. So far as I am aware, no such proposal has resulted in a satisfactory, commercially used, method of tempering hollow glass articles, such as bottles and jars, as they are produced rapidly by known commercial methods and machinery.

A general object of the present invention is to obviate or cure defects which I have discovered in such prior proposals and which will now be pointed out.

Hollow glass articles of commerce are of an almost infinite number of specifically different shapes. Each such article has walls which are different at a number of places in thickness, curvature, angularity, direction in respect to the central axis of the article, diameter or transverse area, or some other physical feature. Even articles of the same kind as produced in succession by the same physical elements of the same glassware forming machine may differ more or less among themselves in one or more of such physical features. Many of such articles have openings of but slight or relatively restricted area in cross-section which afford the only means of access to the interior for application of a cooling medium to the internal surface of the article. In view of these facts, it is not possible, as a practical matter, to so adjust the cooling influence applied at every point on the inner surface and on the outer surface of a hollow glass article that is being tempered so that all portions of all walls of that article will be cooled at exactly the differing rates required to provide the desired primary or temperity permanent stresses in the form of compression of the surface layers and tension of the intermediate layers of glass of each portion of each wall of the article without also causing undesirable secondary, non-temperity permanent stresses in the form of bending moments and/or unsuitably located tension on glass of the article. These secondary stresses, if sufficiently great at any place, may actually exceed the primary or temperity stresses, which have no bending moment. They may create a condition of tension at the surface of one or more portions of the tempered article and thus greatly weaken the article at such point or points. I have classified both the primary and secondary stresses as "permanent" as both will persist in a finally cooled article while that article remains intact.

The prior proposals for tempering glass articles to which I have referred fail to take into consideration the presence of these undesirable but inevitable secondary permanent stresses in hollow glass articles that have been tempered according to such proposals or to point out any way of diminishing or dealing with such secondary stresses or the injurious effects thereof.

Furthermore, such prior proposals contemplate tempering operations which, because of the length of the abrupt cooling periods necessarily required, are too slow to be suitable for modern commercial glassware manufacturing and handling requirements.

An object of the present invention is to provide a method of tempering hollow glass articles so as to provide satisfactory temperity thereof and at the same time to keep to a minimum or relatively low the secondary or non-temperity stresses which the particular cooling operation that is employed tends to create in the tempered article.

A further object of the invention is to effect a substantial reduction in the time required for tempering of a hollow glass article from that required by prior proposals.

The present invention is based in part on the discovery of the source of the hereinbefore described defects in the prior proposals for tempering hollow glass articles, such as bottles or jars, and in part on a conception and development of a practical way of remedying such defects. I have discovered that the harmful non-temperity secondary stresses created by the abrupt cooling of an article of hollow glassware to create primary or temperity stresses therein will vary when any known cooling means or agency is employed directly with the length of the tempering range through which such abrupt cooling is effected. To carry out the present invention, based in part on this discovery, I propose, as the preferred method of tempering a particular hollow glass article to start the abrupt cooling thereof at a point in its tempering range immediately or not much above that at which the application of cooling medium to the article to cool it at the rate required to provide the temperity desired would cause breakage or rupture of the article.

According to the present invention, there is for each particular type of hollow glass article a combination of a most suitable relatively low starting point of abrupt cooling in the tempering temperature range of the article and a most suitable cooling rate for the production of a particular temperity in the article with a minimum of undesirable secondary permanent stresses. This combination may be ascertained for each particular article and thereafter used for the tempering of other similar articles. The location of the most suitable starting point in the tempering temperature range involved and the most suitable cooling rate will vary according to the temperity desired and with the shape and other physical features and the composition of the article.

It is, however, within the purview of the invention to use starting points within a range extending upwardly for a substantial distance in the tempering scale from the most suitable starting point for a given hollow article, and to use cooling rates correspondingly lower than the most suitable cooling rate in order to provide the same or approximately the same temperity of such article. Such departures from the most suitable and preferred starting point and cooling rate will be attended by increases in the undesirable secondary permanent stresses in the articles and in the periods of time required for the cooling operations and thus tend to deprive the user of the maximum possible advantages of the invention. It is to be noted, moreover, that, in each instance, the most suitable starting point in order to obtain adequate temperity is far down in the tempering temperature range for a particular article, usually being relatively near to the midway point of that range, and that any higher starting point within the purview of the present invention for obtaining the same or approximately the same temperity by the use of a lower cooling rate is still substantially below that at which cooling should be started according to prior proposals, generally being within a range of approximately 70° F. upward from the most suitable starting point.

Each glass article may be chilled abruptly from a relatively low starting point in its tempering temperature range to or below the strain point of the glass of the article, after which more moderate cooling of the article may be effected to bring it to room or handling temperature. The change from abrupt chilling to more moderate cooling of the article after it has passed its strain point may be at its lower tempering limit or at a still lower temperature, as determined for a particular article by individual preference, convenience or service conditions. Of course, no further permanent stresses will be created in the glass by the cooling thereof, whether abrupt or moderate, after the glass is below its lower tempering limit.

The following explanation of operations which I have performed on hollow glass articles of a particular type, i. e., stubby beer bottles, will aid in affording an understanding of the invention and of the practice thereof. These stubby bottles were made from glass having characteristics as follows:

*Chemical composition*

|  | Percent |
|---|---|
| Silica ($SiO_2$) (by difference) | 73.37 |
| Iron and alumina ($R_2O_3$) | 1.23 |
| Calcium oxide (CaO) | 5.08 ⎱ 8.78 |
| Magnesia (MgO) | 3.70 ⎰ |
| Barium oxide (BaO) | .33 |
| Sodium oxide ($Na_2O$) | 15.34 ⎱ 15.95 |
| Potassium oxide ($K_2O$) | .61 ⎰ |
| Boric oxide ($B_2O_3$) | .34 |

Specific gravity (25.5° C./25.5° C.), 2.4877.
Softening temperature, 1288° F.
Strain point (log. viscosity=13.4), 894° F.

A number of these bottles were brought to a uniform temperature throughout at 1115° F. They were then cooled abruptly from that temperature to a temperature just below the strain point. The cooling means employed was similar to that which is disclosed in the application of Thomas D. Green, Serial No. 306,085, filed November 25, 1939, which includes a nozzle for applying jets of air to the internal surface of the bottle and a cooperative cooling air applicator for applying jets of air to the external surface of the bottle together with a means for effecting a relative rotation between the bottle and the jets of cooling air impinging on the surfaces thereof, the axis of rotation being that of the bottle. This cooling means also includes provisions intended and utilized as fully as possible to apportion the coolant to different portions of the bottles in accordance with the differing physical features of such portions, such as shape, mass, etc. The coolant employed was air under a pressure of approximately 30 lb. per sq. inch average for the internal and external applications, the inner application being at the higher pressure.

Approximately 6 seconds were required to cool each such bottle from the starting point of 1115° F. down to the strain point. The bottles were well tempered, having an average temperity of approximately 1100 millimicrons per centimeter squared (being the maximum retardation per unit light path per unit thickness of glass). They exhibited the desired primary stresses in the form of compression of surface layers and tension of internal layers of the glass throughout all portions of each bottle. The undesirable secondary stresses were noted but were not of sufficient consequence to render the tempering operation or the tempered bottles commercially unsatisfactory.

I then tempered similar bottles to the same degree of temper with the same mechanism and according to the same procedure except that the bottles were brought to thermal uniformity at a temperature as near the beginning of softening as risk of deformation of such bottles on handling would permit and cooling was effected at a rate that had been reduced in proportion to the increase of starting temperature. The time required to bring the temperature of these bottles down to the strain point was of course greatly increased and the tempered bottles had the undesirable secondary stresses of such magnitude and character as greatly to impair the strength of the bottles.

I then tempered other similar bottles by the use of the same mechanism and according to the same procedure in order to ascertain a permissible range of locations of the starting point in the tempering temperature range in order to provide substantially the same temperity, i. e., approximately 1100 millimicrons per centimeter squared, without prohibitive secondary stresses. For the particular bottles in question, using the cooling apparatus referred to, I found that satisfactory tempered bottles of the temperity just mentioned were obtained when abrupt cooling thereof was started within a range extending upwardly from 1115° F. to approximately 1185° F. The former was the lowest starting point at which the cooling rate required to provide the temperity desired could be applied by the use of the cooling mechanism of the aforesaid Green application without undue risk of breakage of the bottles during the tempering operation. The latter was the highest point from which the bottles could be cooled down abruptly by the use of the same cooling means to cool the bottles at the lower rate required to produce the same temperity without causing undesirable secondary stresses of sufficiently great magnitude or extent to constitute a substantial source of weakness in each such bottle.

The temperity referred to, i. e., approximately 1100 millimicrons per centimeter squared, is adequately high for most commercial requirments relating to the strength and toughness of most hollow articles. Indeed, much lower temperities would ordinarily be satisfactory. As aforesaid, the temperity of a given article that is to be obtained will control the identity of the combination of the most suitable starting point and the cooling rate that should be used to provide that temperity, making use, of course, of the most satisfactory available cooling mechanism. In general, both the most suitable starting point and its cooperative cooling rate will be higher the higher the temperity desired and lower if a lower temperity will suffice. For a substantial range of temperities for most types of hollow glass articles of commerce, the most suitable starting points will all be within a range of temperature having an upper limit far below the softening points of the articles involved and a lower limit at least far enough above the strain point of any such article to permit tempering of the article by the use of the cooling mechanism available for that purpose. This lower limit is approximately 150° F. above the strain point for the stubby beer bottles and generally similar articles but may be less for certain particular types of articles.

Variations in capabilities and efficiencies of available cooling mechanisms or cooling media employed for tempering may affect the locations of the most suitable starting points for tempering different hollow glass articles to the temperities desired, and also the extent of upward ranges from such starting points of permissible locations of starting points from which such articles may be cooled at lower rates to the same temperities without prohibitive secondary stresses.

When temperatures of glass articles are given herein or in the appended claims, they are to be understood as mean or average temperatures if the articles in question have different temperatures at different parts. Similarly, cooling rates given are mean or average rates unless otherwise stated if different portions of the articles involved are subjected to different cooling influences or cooled at different rates.

The invention has been described herein with particular reference to its use in tempering hollow glass articles, such as bottles and jars. It may however be usefully employed in tempering all glass articles, including flat glass, which are cooled during tempering in such manner and by such means as to cause undesirable secondary stresses therein.

What I claim is:

1. The method of processing a hollow glass article to temper it to a particular temperity and at the same time to minimize non-temperity or secondary stresses therein which consists in predetermining the factors of said temperity in terms of the lowest possible safe starting temperature and the rate of abstraction of heat from the article required to temper it to said temperity without causing it to break, bringing the article to or closely above said starting point, and then cooling it rapidly to a temperature below its strain point by applying to the surfaces of said article jets of cooling gaseous medium regulated as to cooling effect on different portions of said article to provide said rate of abstraction of heat with a minimum of disproportionate cooling of said different portions of the article.

2. The method of processing glass articles to develop permanent temperity stresses and to minimize non-temperity or secondary stresses therein which consists in bringing the glass of each such article to a temperature not greatly in excess of the midway point of its tempering temperature range, and rapidly cooling the glass of the article to the lower limit of its said tempering temperature range at the cooling rate required to provide the desired temperity in the article.

3. The method of tempering a bottle, jar or other hollow glass article, the walls of which are different for different parts of the article in thickness, curvature, direction in respect to the central axis of the article or diameter, to a predetermined temperity without creating prohibitive non-temperity or secondary stresses therein which consists in bringing the article to a starting temperature substantially below its softening point and substantially above but not exceeding 291° F. above its strain point, and rapidly cooling the article from said starting temperature to a temperature below said strain point by applying to said article a cooling influence regulated to provide the cooling rate required to produce said temperity and to minimize disproportionate cooling of different portions of the article.

4. The method of tempering hollow glass articles, the glass of which has a softening point in the neighborhood of 1288° F. and a strain point (log. viscosity=13.4) in the neighborhood of 894° F., which comprises bringing each such article to a starting temperature located within a range extending upwardly from approximately 1115° F. to approximately 1185° F., and rapidly cooling said article from said starting temperature to a temperature below the strain point of the glass of said article.

5. The method of tempering hollow glass articles, the glass of which has a softening point in the neighborhood of 1288° F. and a strain point (log. viscosity=13.4) in the neighborhood of 894° F., which comprises bringing each such article to a starting temperature located within a range extending upwardly from approximately 1115° F. to approximately 1185° F., and rapidly cooling said article from said starting temperature to a temperature below the strain point of the glass of said article at the highest available cooling rate said article will endure without breaking at its said starting temperature.

6. The method of tempering hollow glass articles, the glass of which has a softening point in the neighborhood of 1288° F. and a strain point (log. viscosity=13.4) in the neighborhood of 894° F., to substantially the same temperity which comprises bringing each such article to a starting temperature located within a range extending upwardly from approximately 1115° F. to approximately 1185° F., and rapidly cooling said article from said starting temperature to a temperature below the strain point of the glass of said article at a relatively high rate when the starting temperature is approximately 1115° F. and at a proportionately reduced rate when the starting temperature is higher in said range.

7. The method of tempering hollow glass articles, the glass of which has a softening point in the neighborhood of 1288° F. and a strain point (log. viscosity=13.4) in the neighborhood of 894° F., which comprises bringing each such article to a starting temperature below an upper limit of approximately 1185° F., and rapidly cooling said article from said starting temperature to a temperature below the strain point of the glass of said article.

8. The method of tempering hollow glass articles, the glass of which has a softening point in the neighborhood of 1288° F. and a strain point (log. viscosity=13.4) in the neighborhood of 894° F., which comprises bringing each such article to a starting temperature not in excess of approximately 1185° F., and rapidly cooling said article from said starting temperature to a temperature below the strain point of the glass of said article at the highest available cooling rate said article will endure without breaking at its said starting temperature.

DONALD W. MUELLER.